(12) United States Patent
Mantell (10) Patent No.: US 9,227,424 B1
(45) Date of Patent: Jan. 5, 2016

(54) SYSTEM AND METHOD FOR MISSING EJECTOR CORRECTION FOR HALF-TONED IMAGES IN THREE-DIMENSIONAL OBJECT PRINTING BY ADDING DROPS IN OTHER LAYERS

(71) Applicant: Xerox Corporation, Norwalk, CT (US)

(72) Inventor: David A. Mantell, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/572,114

(22) Filed: Dec. 16, 2014

(51) Int. Cl.
*B41J 2/045* (2006.01)
*B41J 2/21* (2006.01)
*H04N 1/405* (2006.01)

(52) U.S. Cl.
CPC ............ *B41J 2/2139* (2013.01); *H04N 1/4051* (2013.01)

(58) Field of Classification Search
CPC ...... B41J 2/2142; B41J 2/04501; B41J 2/125; B41J 2/2139; B41J 2/2146
See application file for complete search history.

(56) References Cited

U.S. PATENT DOCUMENTS

| 7,050,197 B1* | 5/2006 | Szumla | H04N 1/32561 358/1.15 |
| 7,693,595 B2 | 4/2010 | Silverbrook | |
| 9,010,898 B2* | 4/2015 | Gerrits et al. | 347/14 |
| 2008/0118655 A1 | 5/2008 | Kritchman | |
| 2013/0201234 A1* | 8/2013 | Sasayama | 347/12 |

FOREIGN PATENT DOCUMENTS

WO 2004/024447 A2 3/2004

* cited by examiner

*Primary Examiner* — Thinh Nguyen
(74) *Attorney, Agent, or Firm* — Maginot Moore & Beck LLP (57) ABSTRACT

A method for compensating for inoperative ejectors in a three-dimensional object printer has been developed. A printer generates half-tone data for a material for each layer of a three-dimensional object. The printer detects half-tone data that corresponds to an inoperative ejector of a printhead. The printer modifies the half-tone data by moving the half-tone values corresponding to the inoperative ejector to adjacent positions within the generated half-tone data in which a zero half-tone value is stored. The printer operates the printhead with reference to the modified half-tone data to print the three-dimensional object.

16 Claims, 5 Drawing Sheets

SYSTEM AND METHOD FOR MISSING EJECTOR CORRECTION FOR HALF-TONED IMAGES IN THREE-DIMENSIONAL OBJECT PRINTING BY ADDING DROPS IN OTHER LAYERS

TECHNICAL FIELD

The system and method disclosed in this document relate to printers that produce three-dimensional objects and, more particularly, to compensating for inoperative ejectors in such printers.

BACKGROUND

Digital three-dimensional manufacturing, also known as digital additive manufacturing, is a process of making a three-dimensional solid object of virtually any shape from a digital model. Three-dimensional printing is an additive process in which one or more printheads eject successive layers of material on a substrate in different shapes. Three-dimensional printing is distinguishable from traditional object-forming techniques, which mostly rely on the removal of material from a work piece by a subtractive process, such as cutting or drilling.

The production of a three-dimensional object with these printers can require hours or, with some objects, even days. One issue that arises in the production of three-dimensional objects with a three-dimensional printer is consistent functionality of the ejectors in the printheads that eject the drops of material that form the objects. During printing of an object, one or more ejectors can deteriorate by ejecting the material at an angle, rather than normal, to the ejector, ejecting drops that are smaller than an ejector should eject, or by failing to eject any drop at all. An ejector suffering from any of these operational deficiencies is known as an inoperative or malfunctioning ejector. If the operational status of one or more ejectors deteriorates during object printing, the quality of the printed object cannot be assessed until the printing operation is completed. Consequently, print jobs requiring many hours or multiple days can produce objects that do not conform to specifications due to inoperative ejectors in the printheads. Once such objects are detected, the printed objects are scrapped, restorative procedures are applied to the printheads to restore ejector functionality, and the print job is repeated.

Systems that enable detection of inoperative ejectors while printing have been developed. A system that applies restorative procedures to compensate for inoperative ejectors during object printing would enable the continued production of a properly formed object. In this manner, product yield for the printer would be improved and its printing would be more efficient.

SUMMARY

A method that compensates for a malfunctioning ejector in a three-dimensional object printer includes generating halftone data for a material to be ejected into each layer of an object, detecting halftone data for the material in one layer that corresponds to a malfunctioning ejector in a printhead that ejects the material, modifying the generated halftone data in at least one position corresponding to at least one functional ejector and being adjacent to the halftone data that corresponds to the malfunctioning ejector, the modification of the generated halftone data being made with reference to the generated halftone data that corresponds to the malfunctioning ejector, and operating the printhead with reference to the modified generated halftone data to enable the at least one identified functional ejector to be operated with the halftone data corresponding to the malfunctioning ejector.

A three-dimensional printer that implements the method for compensating for a malfunctioning ejector includes a printhead having a plurality of ejectors configured to eject material drops, a sensor configured to generate data corresponding to the material drops ejected by the ejectors in the printhead, and a controller operatively connected to the printhead and the sensor, the controller being configured to: generate halftone data for a material to be ejected into each layer of an object, detect halftone data for the material in one layer that corresponds to a malfunctioning ejector in a printhead that ejects the material, modifying the generated halftone data in at least one position corresponding to at least one functional ejector and being adjacent to the halftone data that corresponds to the malfunctioning ejector, and operate the printhead with reference to the modified generated halftone data to enable the at least one identified functional ejector to be operated with the halftone data corresponding to the malfunctioning ejector.

BRIEF DESCRIPTION OF THE DRAWINGS

The foregoing aspects and other features of a system and method for compensating for a malfunctioning ejector in a three-dimensional object printer are explained in the following description, taken in connection with the accompanying drawings.

DETAILED DESCRIPTION

For a general understanding of the environment for the system and method disclosed herein as well as the details for the system and method, reference is made to the drawings. In the drawings, like reference numerals designate like elements.

Figure 1:
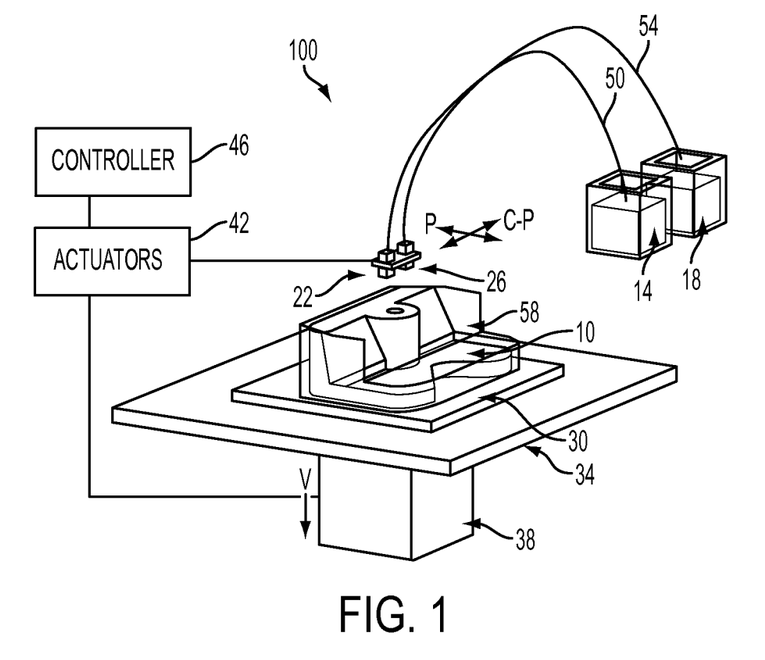
FIG. 1 is a perspective view of a three-dimensional object printer.

FIG. 1 shows a configuration of components in a printing system 100, which produces a three-dimensional object or part 10. As used in this document, the term "three-dimensional printer" refers to any device that ejects material with reference to image data of an object to form a three-dimensional object. The printing system 100 includes a support material reservoir 14, a building material reservoir 18, a pair of ejector printheads 22, 26, a build substrate 30, a planar support member 34, a columnar support member 38, an actuator 42, and a controller 46. Conduit 50 connects printhead 22 to support material reservoir 14 and conduit 54 connects printhead 26 to building material reservoir 18. Both ejector printheads are operated by the controller 46 with reference to three-dimensional image data in a memory operatively connected to the controller to eject the support and building materials supplied to each respective printhead.

Each datum stored in a single location in the three-dimensional image data is defined as a "voxel" in this document. The building material forms the structure of the part 10 being produced, while the support structure 58 formed by the support material enables the building material to maintain its shape while the material solidifies as the part is being constructed. After the part is finished, the support structure 58 is removed by washing, blowing, or melting.

The controller 46 is also operatively connected to at least one and possibly more actuators 42 to control movement of the planar support member 34, the columnar support member 38, and the printheads 22, 26 relative to one another. That is, one or more actuators can be operatively connected to structure supporting the printheads to move the printheads in a process direction and a cross-process direction with reference to the surface of the planar support member. Alternatively, one or more actuators can be operatively connected to the planar support member 34 to move the surface on which the part is being produced in the process and cross-process directions in the plane of the planar support member 34. As used herein, the term "process direction" refers to movement along one axis in the surface of the planar support member 34 and "cross-process direction" refers to movement along an axis in the planar support member surface that is orthogonal to the process direction axis in that surface. These directions are denoted with the letters "P" and "C-P" in FIG. 1. The printheads 22, 26 and the columnar support member 38 also move in a direction that is orthogonal to the planar support member 34. This direction is called the vertical direction in this document, is parallel to the columnar support member 38, and is denoted with the letter "V" in FIG. 1. Movement in the vertical direction is achieved with one or more actuators operatively connected to the columnar member 38, by one or more actuators operatively connected to the printheads 22, 26, or by one or more actuators operatively connected to both the columnar support member 38 and the printheads 22, 26. These actuators in these various configurations are operatively connected to the controller 46, which operates the actuators to move the columnar member 38, the printheads 22, 26, or both in the vertical direction.

Figure 2:
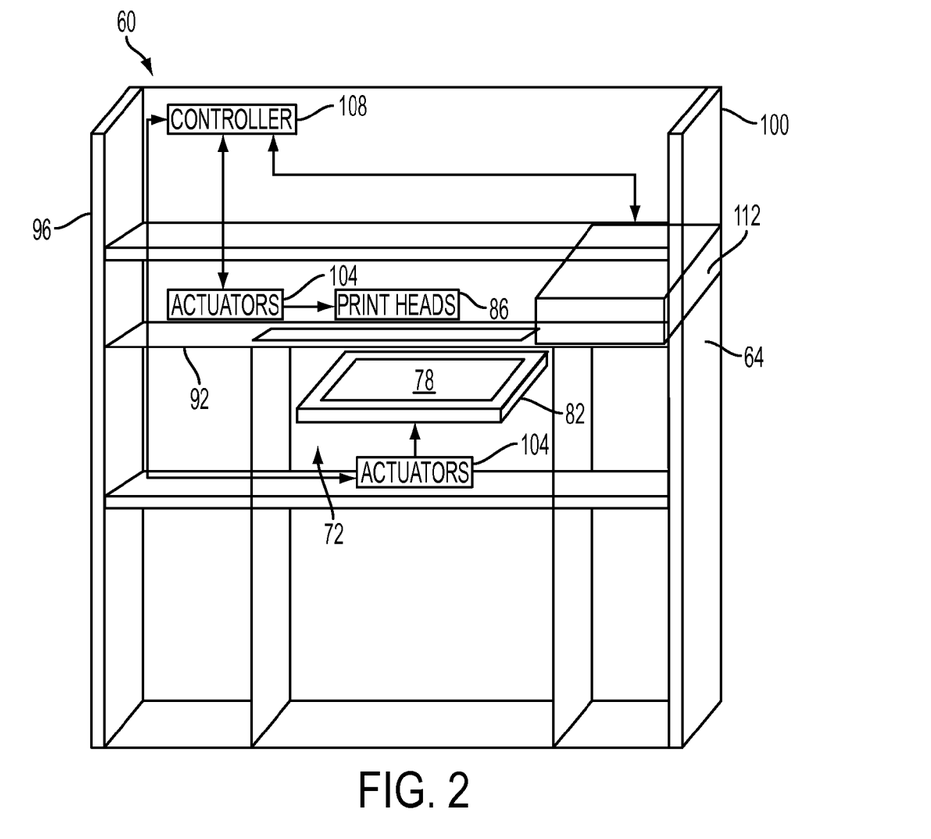
FIG. 2 is a front view of a three-dimensional object printer having a housing that depicts a detection module within the housing that enables inoperative ejectors in a printhead to be detected during a printing operation.

A three-dimensional object printer having a housing is shown in FIG. 2. A printer 60 has a housing 64. Within the housing 64 are six compartments that are generally cubic in shape. The housing 64 is shown in FIG. 2 without the doors that close to conceal the compartments. Compartment 72 includes a planar support 78 on a movable platform 82. Movable platform 82 is configured with one or more actuators and guide members (not shown) to enable the movable platform 82 to move up and down in a vertical direction. The planar support 78 is the surface on which a three-dimensional object is formed. In some embodiments, the printheads 86 have a length that is approximately equal to the length of the planar support 78 in the direction from the back wall of compartment 72 to the opening at the front of the compartment. In these embodiments, printheads 86 are mounted on support member 92 in the space between sidewalls 96 and 100 of housing 64 for linear reciprocating movement only. In other embodiments, the printheads 86 have a length that is less than the length of the planar support 78 in the direction from the back wall of compartment 72 to the opening at the front of the compartment. In these embodiments, printheads 86 are mounted on support member 92 in the space between sidewalls 96 and 100 of housing 64 for reciprocating movement in two orthogonal directions in a plane above compartment 72. In these various embodiments, one or more actuators 104 are operatively connected to the printheads 86. Controller 108 operates the actuators 104 to move the printheads 86 either linearly back and forth on support member 92 or to move the printhead in two orthogonal directions within a plane. By selectively operating the ejectors in the printheads 86, vertically moving the support platform 82, and horizontally moving the printheads 86 on the member 92, a three-dimensional object can be formed on the planar support 78.

The housing 64 further includes a detection module 112 that is configured to detect inoperative ejectors in the printer 60. As noted above, if an ejector fails during printing of an object by either completely or partially failing to eject material or by errantly ejecting material in a skewed direction, the object being produced is malformed. The detection module 112 is configured to detect inoperative ejectors during object production. In some embodiments, at predetermined times in the printing operation, the controller 108 operates an actuator 104 to move the printheads 86 into the detection module 112. The detection module 112 generates a signal to the controller 108 to operate the ejectors in the printheads 86 to print a test pattern on a surface of a substrate or other suitable surface. After the test pattern is printed, controller 108 can move the printheads 86 out of the detection module. The detection module 112 collects data from the printed test pattern. The data can include image data, thickness data, electrical conductivity data, or any other relevant data. The data can be collected using a sensor, such as an optical sensor, an ultrasonic sensor, or a conductivity sensor. The detection module 112 analyzes the data to identify inoperative ejectors. If inoperative ejectors are identified, the detection module 112 generates a signal indicative of the defective printhead and sends it to the controller 108. A signal indicative of the defective printhead can also be sent or displayed to the operator of the printer.

Figure 3:
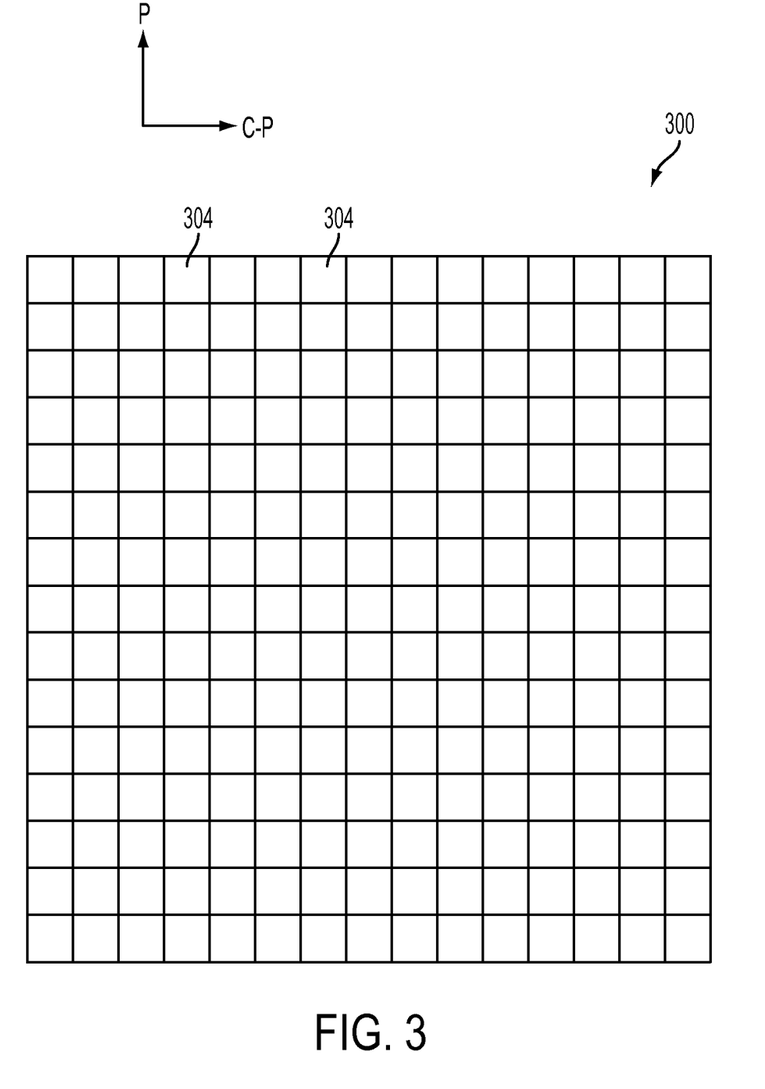
FIG. 3 shows a schematic representation of a one bit per pixel bi-level bitmap used to control a printhead when printing layer of a three-dimensional object.

FIG. 3 is a schematic representation of a one bit per pixel bi-level bitmap 300 used by the controller 108 to control the printheads 86 when printing a three-dimensional object. The bitmap 300 comprises a plurality of pixels 304 that correspond to a particular layer of the three-dimensional object. The pixels 304 are logically arranged in side by side linear rows and columns that correspond to print locations in the particular layer. Each pixel 304 comprises a data bit that indicates whether or not a drop is ejected at the corresponding print location in the particular layer. By way of example, a "1" can indicate that a drop is ejected, while a "0" can indicate that no drop is ejected.

The controller 108 uses a plurality of such bitmaps to control the printhead 86 to print a three-dimensional object. Generally, the controller 108 uses a bitmap for each layer of each material used in the three-dimensional object. The materials available to the printer 60 can include build materials of various primary colors, such as cyan, magenta, yellow, and black, and a support material, such as wax. The data content of the bitmaps can comprise the result of half-toning continuous tone data associated with the three-dimensional object. Particularly, the controller 108 can be configured to receive continuous tone data associated with the three-dimensional object and apply a dithering algorithm to the continuous tone data to generate half-tone data to fill the bitmaps. For example, the controller 108 can be configured to apply a threshold based dithering algorithm wherein continuous tone values are compared to a predetermined threshold value to determine corresponding half-tone values.

When an inoperative ejector is identified, the controller 108 begins restorative procedures to compensate for the inoperative ejector. Particularly, the controller 108 is configured to identify pixels of the bitmaps that are associated with print locations that are printed by the inoperative ejector and to modify the half-tone data of the bitmaps to compensate. If an identified pixel has a half-tone value of "1", it is moved to or swapped with an adjacent pixel associated with a functional ejector having a half-tone value of "0". In this way, the controller compensates for the drops of material that the inoperative ejector fails to eject.

As used herein, "adjacent" means that the print location selected for a compensating pixel is sufficiently close to the print location of the pixel corresponding to the inoperative ejector that placing a drop in the compensating location satisfactorily compensates for failure of the inoperative ejector to print a drop in the intended location. For example, in some printer systems, substitute drops are ejected within three print locations from the print location of the inoperative ejector in order to achieve satisfactory compensation.

Figure 4:
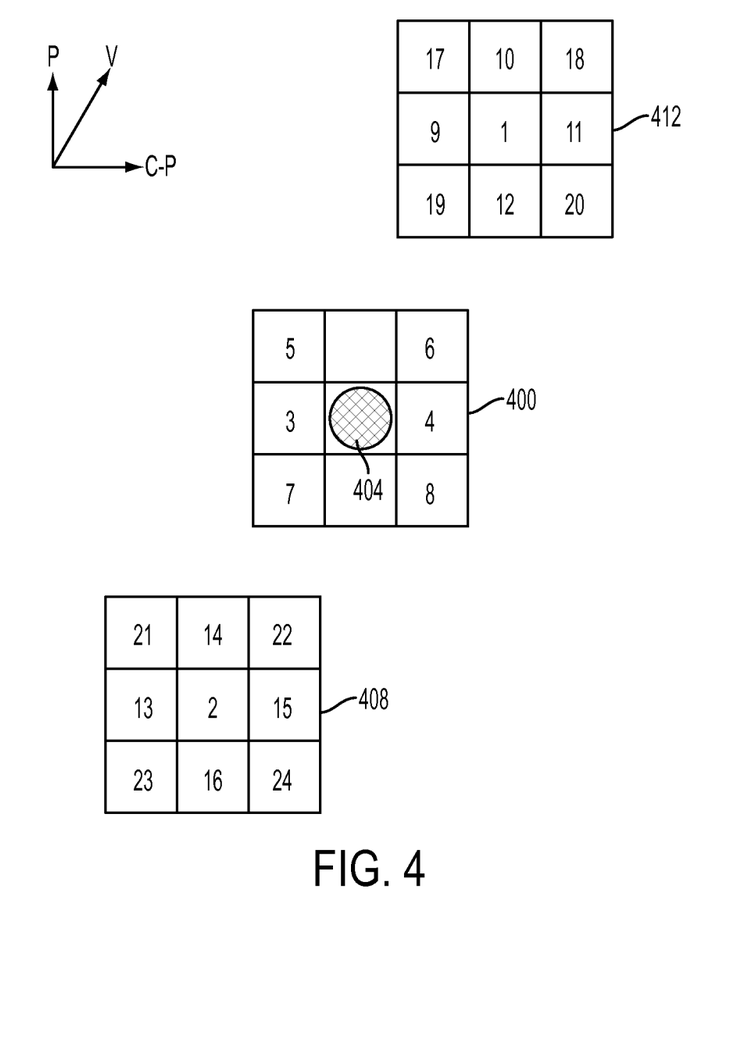
FIG. 4 illustrates a scheme for identifying an available adjacent pixel that can be modified to compensate for an inoperative ejector.

FIG. 4 illustrates a scheme for identifying an available adjacent pixel to swap with a pixel that is to be printed by an inoperative ejector. Bitmap portion 400 is a portion of a bitmap for a particular layer of a material having a missing pixel 404. The missing pixel 404 is a pixel that is determined to be associated with an inoperative ejector. Bitmap portion 408 is a portion of a bitmap for the immediately previous layer. Bitmap portion 412 is a portion of a bitmap for the immediately subsequent layer. The bitmap portions 400, 408, and 412 correspond to print locations that coincide with one another between layers. Accordingly, the pixels of the bitmap portions 400, 408, and 412 are those pixels that are closest to the missing pixel 404 and, therefore, effective candidates for substitution.

An exemplary sequence of preferred pixel locations is identified with the integers 1 through 24 in FIG. 4. As shown, the sequence first checks directly adjacent pixels in the same row and column of the previous or subsequent layer. If one of these pixels has a half-tone value of 0, then the missing pixel 404 is swapped with that pixel. If both pixels have half-tone values of 1, then the sequence moves on to check directly adjacent pixels in the same row of the same layer. If these pixels are unavailable, then the sequence checks the corner adjacent pixels of the same layer. If these pixels are unavailable, the sequence checks directly adjacent pixels that are in the same row or column of the previous or subsequent layer. Finally, the sequence checks corner adjacent pixels of the previous or subsequent layer. The sequence can be logically expanded to further include adjacent pixels that are two or more locations away from the missing pixel 404.

The specific details of the sequence depicted in FIG. 4 are merely illustrative. The sequence demonstrates a general preference for the pixels closer to the missing pixel 404 because closer pixels can more effectively compensate for the missing pixel 404. The sequence depicted also demonstrates a general preference for pixels in the subsequent layer over pixels in the previous layer, for pixels to the left over pixels to the right in cross-process direction, and for pixels that are above over pixels that are lower in the process direction. These preferences can be chosen arbitrarily or in light of other considerations, such as a nearby color boundary or outer surface. The sequence can be mirrored or otherwise altered in various ways to arrive at many unique permutations.

As depicted in FIG. 4, the sequence excludes the pixels in the same column of the same layer as the missing pixel 404. These pixels are excluded because pixels in the process direction of the same layer are presumed to be associated with the same inoperative ejector as the missing pixel 404. However, pixels in the same column but in the previous or subsequent layer are not similarly excluded because the printhead 86 is presumed to advance in the cross-process direction between layers, such that missing pixels resulting from the inoperative ejector do not coincide between layers. Additionally, if multiple inoperative ejectors have been detected, the sequence should be modified to exclude any pixels associated with another inoperative ejector.

The sequence can be altered to distribute substitute pixels more evenly around a missing pass. Missing pixels associated with an inoperative ejector are often located in a column in the process direction that forms a missing pass. The controller 108 can be configured to employ several different sequences to distribute missing pixels more evenly around the missing pass. For example, if a missing pixel of a missing pass is swapped with a pixel to the left, the controller 108 can use a sequence that prefers pixels to the right for the next missing pixel of the missing pass.

Altering the sequence can be desirable when the missing pixel is adjacent to a support layer. For example, if the subsequent layer comprises a support material, the sequence can be modified to prefer pixels that are not in the subsequent layer, or even exclude pixels in the subsequent layer. Alternatively, if a substitute drop is to be printed during the subsequent layer, delaying printing of nearby drops of support material can be necessary. The missing drops of support material can then be treated as missing pixels so that printer achieves the intended thickness. Similarly, if an inoperative ejector is at an edge separating support and build layers then locations may be excluded that would mix the two materials. Under some circumstances, however, mixing support and build materials may be advantageous. Within solid regions of support some missing drops could be replaced by isolated drops or groups of drops of build material to fill in space left by missing support material jets. Since these drops of build material are not attached to other build material they are removed when the support material is removed.

The sequence can further be modified to include bitmaps for other materials. For example, if an inoperative ejector is detected in a printhead for cyan build material, the sequence can be modified to consider substitute ejectors in printheads that print magenta, yellow, black, white, clear or other color of build material. In this way, the controller 108 can control another printhead to print a substitute drop of a different color in the intended location of the missing pixel. These modifications are appropriate for print locations that are internal to the three-dimensional object so that the color at the surface is not significantly affected. Though limited amounts of other colors, particularly clear for example, could even be used near the surface without significantly degrading the intended color of the object.

Figure 5:
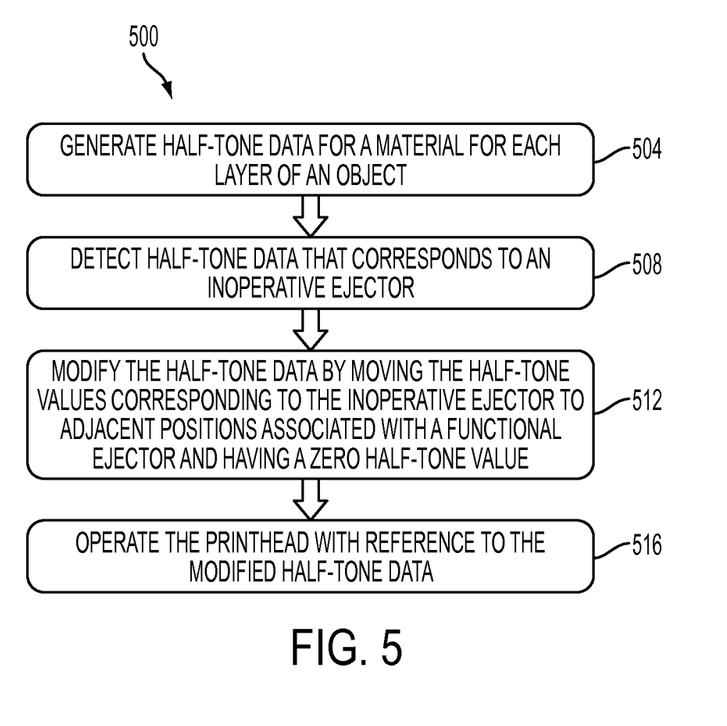
FIG. 5 is a flow diagram for a process for compensating for an inoperative ejector of a printhead.

FIG. 5 depicts a process 500 for compensating for inoperative ejectors in a printhead of a three-dimensional object printer. In the description of this process, statements that the process is performing some task or function refers to a controller or general purpose processor executing programmed instructions stored in a memory operatively connected to the controller or processor to manipulate data or to operate one or more components in the printer to perform the task or function. The controller 108 noted above can be such a controller or processor. Alternatively, the controller 108 can be implemented with more than one processor and associated circuitry and components, each of which is configured to form one or more tasks or functions described herein.

The printer 60 can be configured in the manner noted above to perform to process 500 and is referenced by way of example. The process begins by generating half-tone data for a material for each layer of a three-dimensional object (block 504). The controller 108 receives continuous tone data associated with the three-dimensional object and applies a dithering algorithm to the continuous tone data to generate half-tone data. Next, the process 500 detects half-tone data that corresponds with an inoperative ejector (block 508). The controller 108 commands the printheads 86 to move to the detection module 112, wherein the printheads 86 prints a test pattern that is analyzed by the detection module 112. The detection module 112 generates and sends a signal identifying one or more inoperative ejectors to the controller 108. The controller 108 determines which pixels of the half-tone data are associated with the inoperative ejector.

Next, the process 500 modifies the half-tone data by moving the half-tone values corresponding to the inoperative ejector to adjacent positions having a zero half-tone value (block 512). The controller 108 searches the adjacent pixels around the pixel corresponding to the inoperative ejector to find a pixel that corresponds to a functional ejector and has a half-tone value of "0". When a candidate is found, the controller 108 moves the half-tone value from the pixel corresponding to the inoperative ejector to the adjacent pixel. Finally, after the half-tone data has been modified to compensate for the inoperative inkjet, the process 500 operates the printhead with reference to the modified half-tone data (block 516). The controller 108 uses bitmaps having the modified half-tone data to control the printheads 86 to print the three-dimensional object.

The process of correcting for inoperative ejectors can also be used for printheads capable of printing multiple levels. For example, some printheads can be used to print drops of multiple sizes either through different waveforms or by printing varying numbers of multiple drops in rapid succession so the multiple drops land completely or partially on one another to form a larger drop. The halftoned data used to operate the printheads in such systems consists of multiple level data. In such cases, the data modification can include increasing the data values of adjacent pixels where the data values of those adjacent pixels are less than the maximum data value possible for those pixels. Moreover, the process of compensation for some pixels could include modifying the halftone values of multiple adjacent pixels to account for the material originally assigned to an inoperative ejector.

As noted above, a "voxel" refers to data in one location of three-dimensional image data stored in memory and used to operate the ejectors for forming an object. Another embodiment identifies non-zero voxels in locations neighboring the non-zero voxels associated with a malfunctioning ejector and modifies waveforms of firing signals that are used to operate these ejectors. The modifications to the firing signals increase the volume or mass of the drops ejected by these ejectors at locations adjacent to where the malfunctioning ejector was intended to eject material. This technique can be combined with the method noted above by, for example, modifying waveform parameters for neighboring ejectors to enable the drop mass of neighboring voxels to increase, if no blank voxels are available, and inserting data into blank voxels, which are voxels with a value of "0," in locations neighboring voxels associated with a malfunctioning ejector, if such blank voxels are available.

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the following claims.

What is claimed is:

1. A method of controlling a three-dimensional object printer comprising:

generating halftone data for a material to be ejected into each layer of an object;

detecting halftone data for the material in one layer that corresponds to a malfunctioning ejector in a printhead that ejects the material;

modifying the generated halftone data in at least one position corresponding to at least one functional ejector and being adjacent to the halftone data that corresponds to the malfunctioning ejector, the modification of the generated halftone data being made with reference to the generated halftone data that corresponds to the malfunctioning ejector and the modification includes moving the generated halftone data corresponding to the malfunctioning ejector into the at least one position corresponding to the at least one functional ejector; and operating the printhead with reference to the modified generated halftone data to enable the at least one identified functional ejector to be operated with the halftone data corresponding to the malfunctioning ejector that was moved to the at least one position corresponding to the at least one functional ejector to form a portion of a layer of material drops that is formed prior to a layer corresponding to the halftone data generated for the malfunctioning ejector.

2. The method of claim 1, the modification of the generated halftone data further comprises:

moving generated halftone data corresponding to the malfunctioning ejector into at least one position within the generated halftone data in which a zero halftone value is stored for the at least one functional ejector.

3. The method of claim 1 further comprising:

moving the printhead to position the malfunctioning ejector opposite positions in a next layer of material drops to be formed that are different than the positions opposite the malfunctioning jet in the previously formed layer of material drops.

4. The method of claim 1, the modification of the halftone data further comprising:

generating halftone data for a second material to be ejected into a plurality of layers in the object;

moving halftone data generated for the material to be ejected by the malfunctioning ejector into positions in the halftone data generated for the second material that correspond to positions in the halftone data for the malfunctioning ejector.

5. The method of claim 4, the moving of the halftone data for the malfunctioning ejector further comprising:

moving halftone data generated for the malfunctioning ejector into positions in the halftone data generated for the second material to be ejected into a layer of the object other than a layer corresponding to the halftone data generated for the malfunctioning ejector.

6. The method of claim 5 wherein the positions in the halftone data generated for the second material are in a layer formed before the layer corresponding to the halftone data generated for the malfunctioning ejector.

7. The method of claim 5 wherein the positions in the halftone data generated for the second material are in a layer formed after the layer corresponding to the halftone data generated for the malfunctioning ejector.

8. The method of claim 1, the modification of the generated halftone data further comprising:

modifying at least one multi-level halftone data value in the at least one position corresponding to the at least one functional ejector and being adjacent to the halftone data that corresponds to the malfunctioning ejector, the modification of the at least one multi-level halftone data being made with reference to the generated halftone data that corresponds to the malfunctioning ejector.

9. A three-dimensional object printer comprising:
a printhead having a plurality of ejectors configured to eject material drops;
a sensor configured to generate data corresponding to the material drops ejected by the ejectors in the printhead; and
a controller operatively connected to the printhead and the sensor, the controller being configured to:
generate halftone data for a material to be ejected into each layer of an object;
detect halftone data for the material in one layer that corresponds to a malfunctioning ejector in a printhead that ejects the material;
modifying the generated halftone data in at least one position corresponding to at least one functional ejector and being adjacent to the halftone data that corresponds to the malfunctioning ejector, the modification including moving the generated halftone data corresponding to the malfunctioning ejector into the at least one position corresponding to the at least one functional ejector; and
operate the printhead with reference to the modified generated halftone data that was moved to the at least one position corresponding to the at least one functional ejector to enable the at least one identified functional ejector to be operated with the halftone data corresponding to the malfunctioning ejector to form a portion of a layer of material drops that is formed prior to a layer corresponding to the halftone data generated for the malfunctioning ejector.

10. The printer of claim 9, the controller being further configured to:
modify the generated halftone data by moving generated halftone data corresponding to the malfunctioning ejector into at least one position within the generated halftone data in which a zero halftone value is stored for the at least one functional ejector.

11. The printer of claim 9, the controller being further configured to:
move the printhead to position the malfunctioning ejector opposite positions in a next layer of material drops to be formed that are different than the positions opposite the malfunctioning jet in the previously formed layer of material drops.

12. The printer of claim 9, the controller being further configured to:
generate halftone data for a second material to be ejected into a plurality of layers in the object;
move halftone data generated for the material to be ejected by the malfunctioning ejector into positions in the halftone data generated for the second material that correspond to positions in the halftone data for the malfunctioning ejector.

13. The printer of claim 12, the controller being further configured to:
move the halftone data generated for the malfunctioning ejector into positions in the halftone data generated for the second material to be ejected into a layer of the object other than a layer corresponding to the halftone data generated for the malfunctioning ejector.

14. The printer of claim 13, the controller being further configured to:
move the halftone data generated for the malfunctioning ejector into positions in the halftone data generated for the second material in a layer formed before the layer corresponding to the halftone data generated for the malfunctioning ejector.

15. The printer of claim 13, the controller being further configured to:
move the halftone data generated for the malfunctioning ejector into positions in the halftone data generated for the second material in a layer formed after the layer corresponding to the halftone data generated for the malfunctioning ejector.

16. The printer of claim 9, the controller being further configured to:
modify firing signals delivered to at least one identified functional ejector in the printhead; and
operate the at least one functional ejector in the printhead with the modified firing signal to increase a drop volume of material drops ejected by the at least one functional ejector at positions adjacent to the positions opposite the malfunctioning ejector.

* * * * *